US006561009B1

(12) United States Patent
Perry et al.

(10) Patent No.: US 6,561,009 B1
(45) Date of Patent: May 13, 2003

(54) FUEL VAPOR LEAK TEST SYSTEM AND METHOD COMPRISING P-I-D SETTING OF PULSE BURSTS TO REGULATE TARGET PRESSURE

(75) Inventors: Paul D. Perry, Chatham (CA); Raymond Rasokas, Thamesville (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 10/122,619

(22) Filed: Apr. 15, 2002

(51) Int. Cl.[7] .......................... G01M 3/04

(52) U.S. Cl. .......................... 73/49.7; 73/40.5 R; 702/51

(58) Field of Search .......................... 73/40, 40.5 R, 73/49.7, 118.1; 123/518, 520; 702/51

(56) References Cited

U.S. PATENT DOCUMENTS 6,192,743 B1 * 2/2001 Perry .......................... 73/40
6,253,598 B1 * 7/2001 Weldon et al. .......................... 73/40

OTHER PUBLICATIONS

Yamaguchi et al., US patent application 2001/0049958A1, Dec. 13, 2001.*

Antonioli et al., US patent application 2002/0112528A1, Aug. 22, 2002.*

* cited by examiner

*Primary Examiner*—Helen Kwok
*Assistant Examiner*—Charles Garber

(57) ABSTRACT

A leak test system and method for a motor vehicle fuel system. A pump forces air under pressure into vapor containment space. The pump operates in accordance with steps established by a processor. The pump creates superatmospheric target pressure in the space during an initial charging phase step, and after completion of that step, the pump is duty-cycled to regulate pressure in the space at the target pressure. A duty cycle comprises a burst of individual air pulses, one after another. The processor processes data corresponding to the duty cycle using P-I-D operations to set the number of pulses in a succeeding burst for regulating the pressure. When stability of the duty cycle is attained, the period of the duty cycle indicates leakage from the space.

29 Claims, 5 Drawing Sheets

FUEL VAPOR LEAK TEST SYSTEM AND METHOD COMPRISING P-I-D SETTING OF PULSE BURSTS TO REGULATE TARGET PRESSURE

FIELD OF THE INVENTION

This invention relates generally to a system and method for detecting gas leakage from an enclosed space, such as fuel vapor leakage from an evaporative emission space of a motor vehicle fuel system, especially to a system and method where a pump, such as a diaphragm pump, creates superatmospheric pressure in the space during a test.

BACKGROUND OF THE INVENTION

A known on-board evaporative emission control system for a motor vehicle comprises a vapor collection canister that collects volatile fuel vapors generated in the headspace of a fuel tank by the volatilization of liquid fuel in the tank and a purge valve for periodically purging fuel vapors to an intake manifold of the engine. A known type of purge valve, sometimes called a canister purge solenoid (or CPS) valve, is under the control of a microprocessor-based engine management system, sometimes referred to by various names, such as an engine management computer or an engine electronic control unit.

During conditions conducive to purging, the purge valve is opened by a signal from the engine management computer in an amount that allows intake manifold vacuum to draw fuel vapors that are present in the tank headspace and/or stored in the canister for entrainment with combustible mixture passing into the engine's combustion chamber space at a rate consistent with engine operation so as to provide both acceptable vehicle driveability and an acceptable level of exhaust emissions.

Certain governmental regulations require that certain motor vehicles powered by internal combustion engines which operate on volatile fuels such as gasoline, have evaporative emission control systems equipped with an on-board diagnostic capability for determining if a leak is present in the evaporative emission space.

One known type of vapor leak detection system for determining integrity of an evaporative emission space performs a leak detection test by positively pressurizing the evaporative emission space using a positive displacement diaphragm pump. The diaphragm is reciprocated to create test pressure. Commonly owned U.S. Pat. No. 6,192,743, issued Feb. 27, 2001, discloses a module comprising such a pump.

Known test methods include creating superatmospheric pressure in the closed space being tested and detecting changes that are indicative of leakage. One method comprises measuring a characteristic of pump operation. An example of a time-based measurement is a measurement of how frequently a diaphragm pump must be cycled in order to maintain pressure. Other methods of measurement are pressure-based, such as measuring the rate at which pressure decays. Those methods can provide accuracy when ambient conditions are relatively stable, such as when a vehicle has been parked for an extended period of time. Less stable conditions may impair accuracy of measurements. The dynamics of operating a vehicle may prevent a leak test method from providing consistently accurate results. For example, movement of liquid fuel in a tank, i.e. fuel slosh, might create certain pressure anomalies that could give a false result for a leak test.

The inclusion of various filters, both electrical and mechanical, may mitigate the effects of such anomalies. Even with the presence of such aids, it is believed that further improvement toward assuring consistent accuracy of test results is desirable, and it is toward that objective that the present invention is directed.

Commonly owned pending U.S. patent application Ser. No. 09/896,247, filed Jun. 29, 2001, discloses a system and method that compensates for changes in the output efficiency of a pump due to factors such as temperature, age, friction, etc., so that a leak test can be performed and completed within a specified window of time as the pump efficiency changes. The pump is operated in a manner that creates a succession of pressurizing pulse bursts. Each burst contains a number of pressurizing pulses corresponding to the number of times that the pump is stroked, and the bursts are separated by time intervals during which the pump is not stroked. The invention of that patent application concerns self-compensation for changing pump efficiency as the pump ages.

SUMMARY OF THE INVENTION

The present invention concerns a leak test system and method that in a preferred embodiment employs a diaphragm pump that is stroked to force air into the space being tested. The pump is operated in a manner that creates a succession of pressurizing pulse bursts. Each burst contains a number of pressurizing pulses corresponding to the number of times that the pump is stroked, and the bursts are separated by time intervals during which the pump is not stroked. The present invention departs from the content of Ser. No. 09/896,247 in that it involves measuring leakage in a novel manner that can contribute to more consistent accuracy of results in less than perfectly stable ambient conditions for a leak test. This is because measurements can be taken in greater number and at greater frequency. Because of these larger numbers, any momentary irregularity or disturbance that affects a small percentage of the measurements as they are being taken may well have less effect on the final result than if one measurement of a fewer number of measurements were affected.

That said, the invention does not necessarily require the taking of multiple measurements, and in fact it is possible to perform an acceptable test using a single measurement taken at a certain point in the test, such as at the end of an allotted test time.

Another advantage of the invention is that it can be implemented in software that operates existing hardware in a new and different way according to the inventive principles.

One general aspect of the invention relates to a leak test system for a motor vehicle fuel system that holds volatile liquid fuel for operating the vehicle. The leak test system comprises a processor for establishing steps of a leak test and a pump for forcing air under pressure into vapor containment space of the fuel system during a leak test. The pump operates in accordance with steps established by the processor to create a superatmospheric pressure in the space during an initial step of the leak test. After completion of the initial step and in the presence of leakage from the space, a further step is performed. The pump operates according to a repeating duty cycle wherein the duty cycle comprises forcing air into the space in successive bursts of individual air pulses, each of which bursts is delayed from an immediately prior burst by a time interval during which pressure in the space decays because of the leakage. The processor processes, according to an algorithm, data corresponding to the duty cycle and uses the result of such processing to set the number of individual air pulses in each of subsequent bursts for regulating the pressure in the space substantially to the target pressure. Upon attainment of substantial stability in regulation of the pressure in the space at the target pressure, as indicated by attainment of substantial stability of the duty cycle, the processor processes data correlated with the duty cycle to indicate leakage from the space.

A further aspect of the invention relates to a leak test method for such a motor vehicle fuel system. The method comprises forcing air under pressure into vapor containment space of the fuel system during a leak test in accordance with steps of the method. During an initial step of the method, the forcing of air into the space creates in the space a superatmospheric pressure suitable for performing the leak test. After completion of the initial step and in the presence of leakage from the space, a pump is operated according to a repeating duty cycle wherein the duty cycle comprises forcing air into the space in successive bursts of individual air pulses, each of which bursts is delayed from an immediately prior burst by a time interval during which pressure in the space decays because of the leakage. Data corresponding to the duty cycle is processed according to an algorithm, and the result of such processing is used to set the number of individual air pulses in each of subsequent bursts for regulating the pressure in the space substantially to the target pressure. Upon attainment of substantial stability in regulation of the pressure in the space at the target pressure, as indicated by attainment of substantial stability of the duty cycle, data correlated with the duty cycle is processed to indicate leakage from the space.

BRIEF DESCRIPTION OF THE DRAWINGS

The accompanying drawings, which are incorporated herein and constitute part of this specification, include one or more presently preferred embodiments of the invention, and together with a general description given above and a detailed description given below, serve to disclose principles of the invention in accordance with a best mode contemplated for carrying out the invention.

DESCRIPTION OF THE PREFERRED EMBODIMENT

Figure 1:
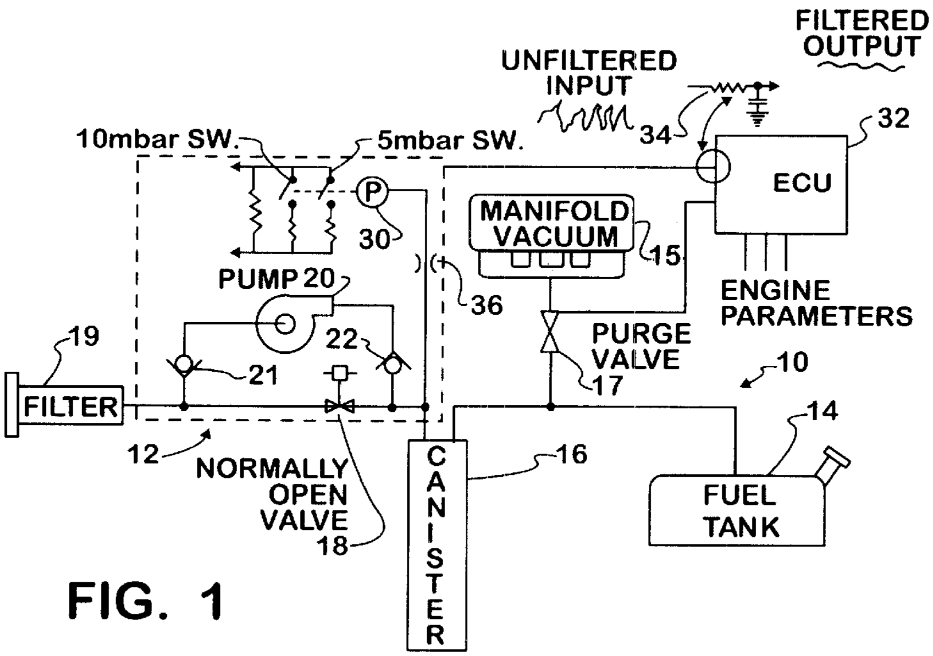
FIG. 1 is a general schematic diagram of an exemplary automotive vehicle evaporative emission control system including a leak test system embodying principles of the invention.

FIG. 1 shows an example of a portion of a motor vehicle fuel system 10, including a leak test system 12. A fuel tank 14 holds a supply of volatile liquid fuel for an engine 15 that powers the vehicle. Fuel vapors that are generated within headspace of tank 14 are collected in a vapor collection canister 16 that forms a portion of an evaporative emission control system.

At times conducive to canister purging, the collected vapors are purged from canister 16 to engine 15 through a purge valve 17. For purging, purge valve 17 and a canister vent valve 18 are both open. Vent valve 18 vents canister 16 to atmosphere through a particulate filter 19, allowing engine manifold vacuum to draw air into and through canister 16 where collected vapors entrain with the air flowing through the canister and are carried into the engine intake system, and ultimately into engine 15 where they are combusted.

From time to time, leak test system 12 conducts a leak test for ascertaining the integrity of the evaporative emission control system against leakage. Purge valve 17 and vent valve 18 are operated closed to close off the space of the evaporative emission system that contains the fuel vapors. That space is then positively pressurized to determine if any leakage is present. A diaphragm pump 20 is used to pressurize the space being tested. Although the space has been closed off, the pump is still able to draw air from atmosphere through filter 19 and a check 21 and to force air under pressure through a check 22 to develop suitable positive pressure in the space for conducting the test.

Details of such a pump and an associated module, and prior leak test procedures, are disclosed in commonly owned U.S. Pat. Nos. 5,967,124; 5,974,861; 6,009,746; 6,016,691; 6,016,793; and 6,192,743 where vent valve 18 is integrated with the module and pump 20 is housed with the module enclosure. The module has ports for establishing proper communication of the pump with the emission control system and of the vent valve with atmosphere through the particulate filter.

Figure 2:
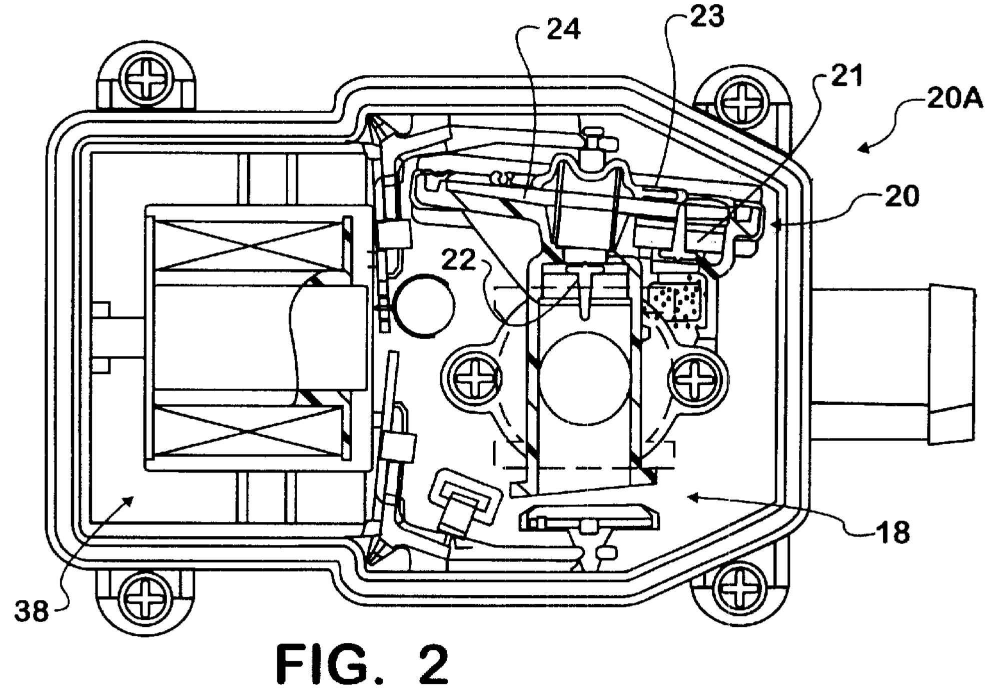
FIG. 2 is a cross section view through an exemplary embodiment of leak test module.
Figure 3:
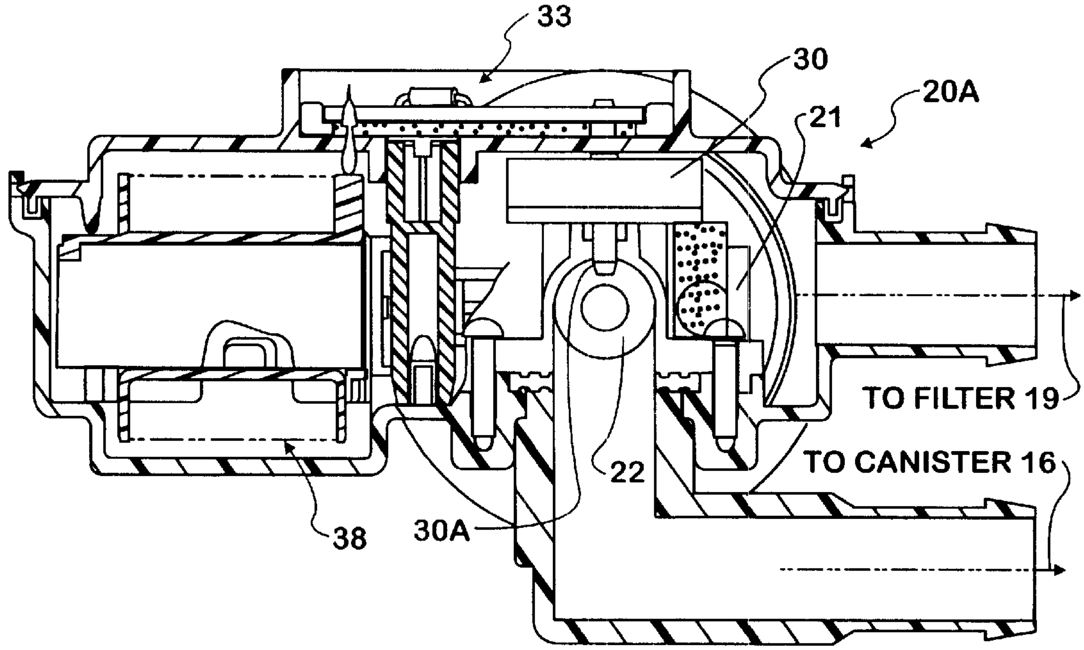
FIG. 3 is another cross section view generally in the direction of arrows 3—3 in FIG. 2.

As shown by FIGS. 2 and 3, a representative leak test module 20A houses a pump 20 comprises a movable wall 23 that has an outer perimeter margin held sealed to the pump housing so as to create a variable volume pumping chamber 24 within the pump interior. When the pump is stroked by a return spring to displace movable wall 23 in a direction that increases the volume of pumping chamber 24, atmospheric air passes through check 21 to create a charge of air in pumping chamber 24 while check 22 prevents the pump from sucking vapor-laden air out of the space being tested. When pump 20 is stroked to displace movable wall 23 in an opposite direction that decreases the volume of pumping chamber 24, the charge of air in the pumping chamber is forced through check 22 while check 21 prevents the charge from being forced back into the atmosphere. Pump is repeatedly stroked back and forth in this manner during a leak test that will be more fully disclosed later.

A pressure sensor 30 of module 20A typically provides a measurement of pressure in the space under. The sensing port 30A of sensor 30 is communicated to sense pressure immediately after check 22.

An engine electronic control unit (ECU) 32 typically controls purge valve 17. It is also typical to place module 20A under control of ECU 32. In its broadest aspect, the present invention contemplates control not only by an engine ECU, but any other control, such as a standalone control that is devoted exclusively to module 20A and may be integrated with the module, as referenced at 33 in FIG. 3. ECU 32 comprises a processor that can obtain and process pressure data from sensor 30, and that can initiate and exercise control over a leak test from start to finish.

FIG. 1 shows some of the various filtering devices mentioned earlier. An electrical filter 34, which may be a hardware filter or a software filter, filters the pressure measurement signal from sensor 30 to ECU 32. An orifice 36 forms a pneumatic filter that filters abrupt changes in pressure that would otherwise be applied directly to sensing port 30A of sensor 30.

Stroking of pump 20 to force air out of pumping chamber 24 is performed by an operator that includes an electric actuator 38 under the control of ECU 32. Each time a pulse from ECU 32 is applied to actuator 38, the actuator causes pump 20 to execute one complete compression stroke that forces a charge of air from pumping chamber 24 into the space under test. In this way, a substantially constant mass of air is pumped into the space under test for each pulse applied by ECU 32 to actuator 38 to stroke pump 20. When the pulse terminates, the return spring expands pumping chamber 24, with a fresh charge of air being drawn into the pumping chamber in the process through check 21 and filter 19.

A preferred leak test method according to the present invention comprises an initial step of operating pump 20 to force air under pressure into the space to create a superatmospheric pressure suitable for performing the test. This is also referred to as the charge, or charging, phase.

After completion of the initial step, pump 20 is duty-cycle operated according to a further step of the method, also referred to as the measurement, or measuring, phase, that comprises forcing pulses of air into the space in successive bursts of individual pulses.

Figures 4A, 4B, 4C:
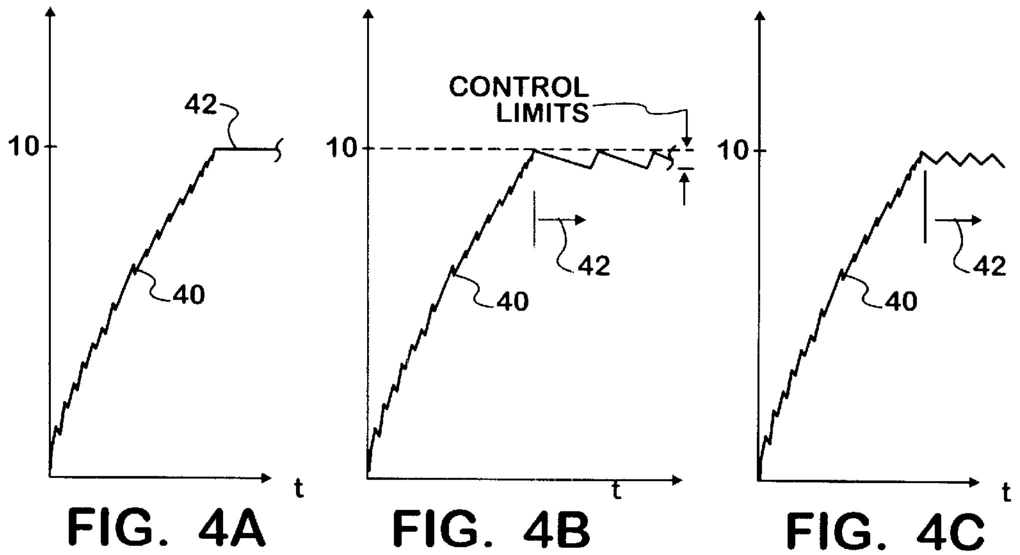
FIGS. 4A, 4B, and 4C are graph plots showing respective traces of pressure versus time representative of different leak conditions in a fuel system that is being leak tested.

Each FIG. 4A, 4B, and 4C shows the initial step, reference numeral 40, that concludes once sensor 30 measures a certain superatmospheric target pressure deemed suitable for performing the test, 10 millibars in the example. A further step, i.e. the measurement phase, reference numeral 42, then commences. Pump 20 now operates in the manner described above. For example, a first burst of pulses may comprise a predetermined number of pulses, forty pulses for example, each applied long enough to assure that pump 20 executes a complete pressurizing stroke that forces a given mass of air from chamber space 24 into the space under test. The mass of air that each pulse forces into the space under test is substantially constant, and so using a predetermined number of pulses for the first burst forces a known mass of air into the space. If the pulses are applied at a rate of 20 hertz, the forty-pulse burst will have a duration of approximately two seconds. A burst having fewer pulses, such as one having only five pulses for example, will have a shorter duration, about one-quarter of a second for a five-pulse burst.

If the space under test is completely free of leaks, pressure in the space will not decrease as a consequence of this first burst, and so the pressure sensed by sensor 30 will not fall below the target pressure during the entire duration of the measuring phase. This type of test result is shown by the trace of FIG. 4A. If a leak is present however, a trace like the ones of FIGS. 4B and 4C will occur.

If the space under test leaks sufficiently to cause the pressure sensed by sensor 30 to fall below the target pressure as the measuring phase progresses, a second burst of pulses will occur. The size of the leak correlates with the time that has elapsed since the first burst, and ECU 32, which is timing the test, uses that elapsed time as a data input for processing data to set the number of pulses that are applied in the second burst. The number of pulses applied in the second burst will strive to restore the pressure in the space to the target pressure, and that number may be the same, substantially the same, or differ substantially from the number in the first burst.

The elapsed time between the second and third bursts is measured, and the process that was used to set the number of pulses in the second burst then iterates to set the number of pulses in the third burst, striving once again to restore the pressure in the space to the target pressure. In this way the control seeks to regulate pressure to the target pressure. Once the number of pulses in each burst and the duration between successive bursts both substantially stabilize, measuring can begin.

Once the target pressure is initially reached, pressure regulation at the target pressure is achieved by proportional, integral, and derivative (PID) control performed by a suitable algorithm programmed in ECU 32 to process the time between successive bursts as data for setting the number of pulses in a succeeding burst.

In this way the pressure in the space under test will remain substantially at the target pressure at which the measurement phase began, i.e. 10 millibars of the example, provided that the capacity of the pump to restore lost pressure is not exceeded. Because the pressure of 10 millibars is known, a corresponding measurement of effective leak size is defined by the frequency at which bursts occur once the number of pulses in a burst has stabilized at a substantially steady number and the time between bursts has also substantially stabilized. An actual measurement of effective leak size may then be made in any of several ways: measuring the time duration of each burst; counting the number of pulses in each burst; measuring the time between the end of one burst and the beginning of a succeeding burst; and measuring the frequency at which bursts are occurring. The latter of the four is equivalent to measuring the period of each burst. If each burst is considered as a single pulse, even when it comprises multiple air pulses, the first of the four ways may be considered as a pulse duration (PD) measurement.

A longer PD, as portrayed by the trace of FIG. 4B, therefore indicates a smaller effective leak size while a smaller PD, as portrayed by the trace of FIG. 4C, indicates a larger effective leak size.

ECU 32 can read pressure from sensor 30 continually, or at least regularly enough, to promptly detect pressure falling below the target pressure by a predetermined amount that will initiate a succeeding pulse burst. When a leak is indicted, it may be desirable, once substantial stability has been attained, to use multiple measurements because with each being taken at a different time, the effect of momentary transients that could impair accuracy (fuel slosh, etc.) is washed out to a large extent.

Figure 5A:
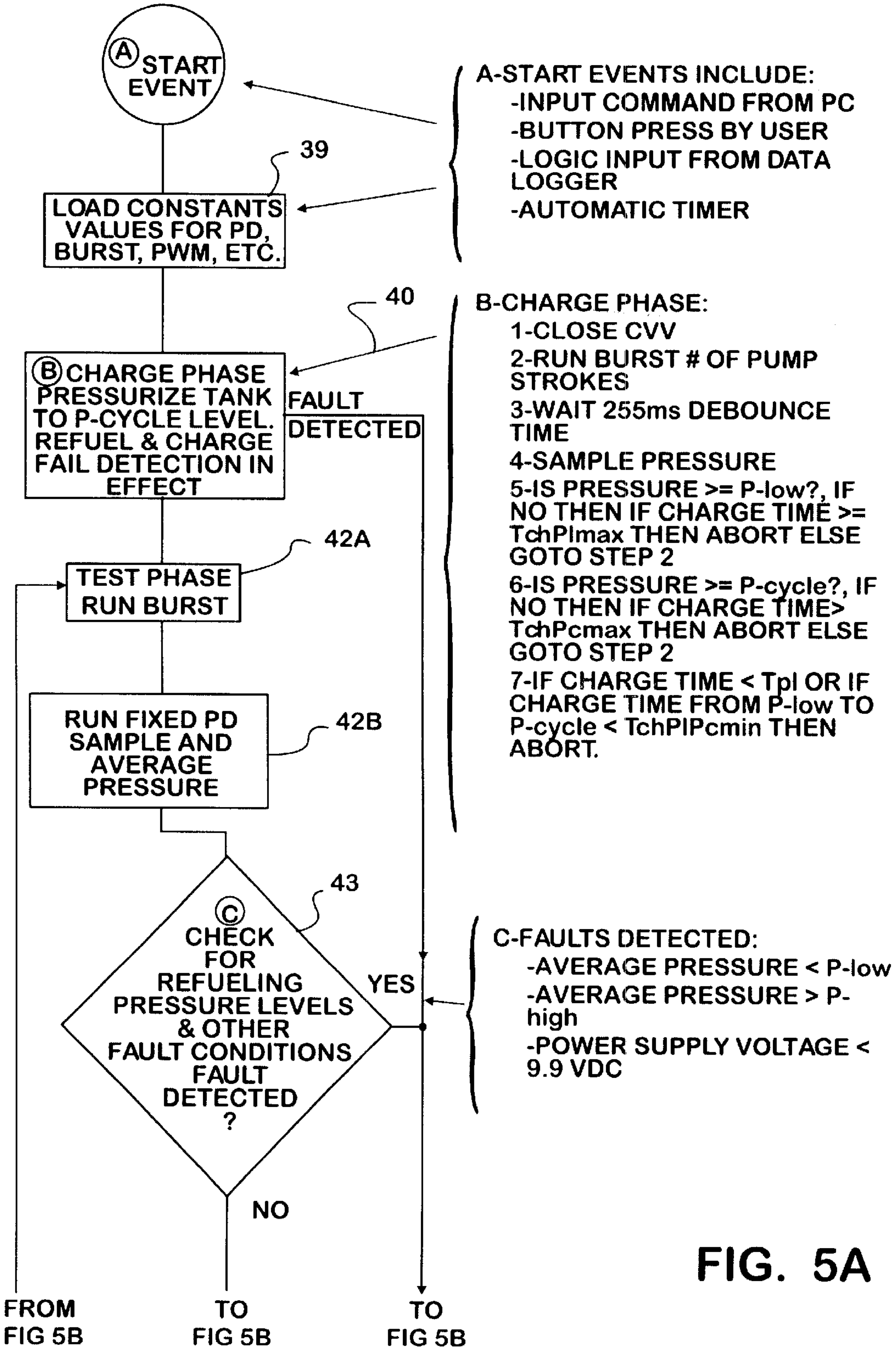
FIG. 5 is a flow diagram of steps of an algorithm embodying the inventive method.
Figure 5B:
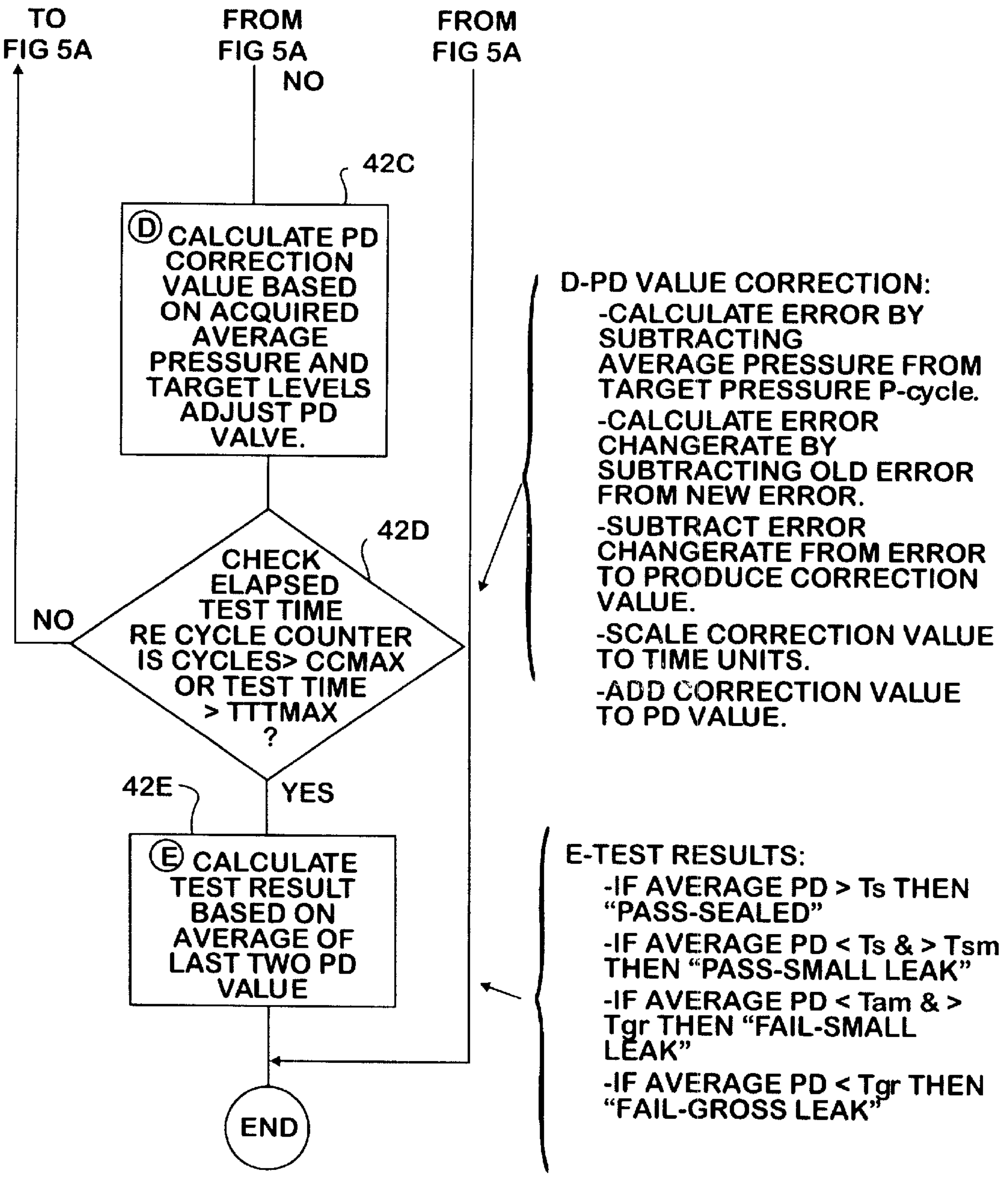

If a gross leak that is beyond the ability of the pump to make up is present during the measuring phase, the control will be unable to perform the desired regulation, and such an event can be indicated as a gross leak. FIG. 5 represents an algorithm that ECU 32 follows and illustrates some detail of various steps including a pressure progress test that serves to identify a gross leak during charge phase 40.

During charge phase 40, ECU 32 regularly processes data corresponding to the pressure measurement provided by sensor 30. The processing compares the pressure measurement data with a predetermined intermediate pressure P-low that is less than the superatmospheric target pressure P-cycle desired for beginning the measurement phase 42. After that comparison, elapsed time on a timer that ECU started at the beginning of the test is compared with a predetermined amount of time TchPlmax.

As long as the measured pressure continues to be less than the predetermined intermediate pressure P-low, and the elapsed time does not exceed the predetermined amount of time TchPlmax, the charge phase continues. However, if the elapsed time exceeds that predetermined amount of time TchPlmax before pressure reaches P-low, the test is aborted because failure to attain the pressure is indicative of a gross leak.

Once the measured pressure reaches the predetermined intermediate pressure P-low within time allowed by the predetermined time TchPlmax, the charge phase is allowed to continue, with pressure continuing to be read and processed. Now however, the processing compares the pressure measurement data with the desired target pressure P-cycle. After each such comparison, elapsed time on the timer that ECU started at the beginning of the test is compared with a predetermined amount of time TchPcmax.

As long as the measured pressure continues to be less than the target pressure P-cycle, and the elapsed time does not exceed the predetermined amount of time TchPcmax, the charge phase continues. However, if the elapsed time exceeds that predetermined amount of time TchPcmax before the pressure reaches the target pressure P-cycle, the test is aborted because failure to attain the pressure is indicative of a gross leak.

Once the measured pressure reaches the desired target pressure P-cycle within time allowed by the predetermined time TchPcmax, one final comparison is made. If the charge time is less than a time Tpl or if the time for charging from pressure P-low to pressure P-cycle is less than a time TchPlPmin, then the test is also aborted. The reason for this final comparison is to detect a blocked or pinched line that could falsely signal a valid test.

Step 42, i.e. the measurement phase, comprises repeatedly executing individual steps 42A, 42B, 42C, and 42D of the algorithm, steps that have already been described within the broader context of step 42. Once the allotted time TTTmax for measurement phase 42 has elapsed, the results are processed (step 42E) to yield a leak determination. While the test can provide an actual effective leak size measurement by various processing techniques as discussed above, results in the example of FIG. 5 are presented in one of four ways based on one or more measurements obtained once substantial stability of pressure has been attained during measurement phase 42. Typically, measurement phase 42 has a defined time duration, such as the 240 seconds in this example.

If average PD obtained by averaging multiple PD measurements taken after stability has been attained is greater than a predefined time Ts that distinguishes between a sealed system and a system that is passable yet has a small leak, the result indicated is "pass-sealed". If average PD obtained by averaging multiple PD measurements taken after stability has been attained is greater than a predefined time Tsm that distinguishes between a system that is failed with a small leak and a system that is passable yet has a small leak, but equal to or less than the time Ts, the result indicated is "pass-small leak". If average PD obtained by averaging multiple PD measurements taken after stability has been attained is greater than a predefined time Tgr that distinguishes between a system that is failed with a gross leak and a system that is failed yet has a small leak, but equal to or less than the time Tsm, the result indicated is "fail-small leak". If average PD obtained by averaging multiple PD measurements taken after stability has been attained is equal to or less than the time Tgr, the result indicated is "fail-gross leak".

Figure 6:
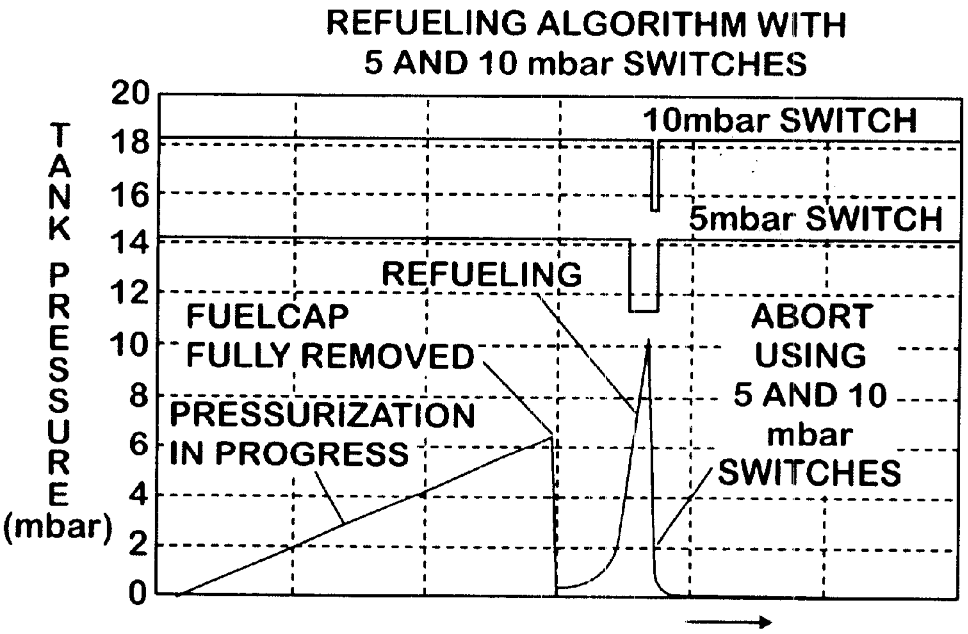
FIG. 6 is a graph plot of pressure versus time illustrating a representative signature of a refueling event that interrupts a leak test.

As the algorithm is executing measuring phase 42 by repeatedly executing steps 42A, 42B, 42C, and 42D it also checks for refueling and various faults that may occur as a test is proceeding, by an interposed step 43 between steps 42B and 42C. FIG. 6 shows how a refueling event can be detected by using a sensor 30 that has two switch points, one at 10 millibars and another at 5 millibars. Detection of a refueling event will cause a test that is in progress to be discontinued. A refueling event can also be detected during charging phase 40, as shown by the example of FIG. 6 where the test is aborted as a consequence of a distinctive refueling spike. Low power supply voltage and pressure extremes can also discontinue a test in progress or prevent a new test from commencing.

An analog pressure sensor 30 that has a suitable range can be used in any embodiment of module.

Alternatively, a switch-type sensor 30 that has one or more switches-can be used, for example, a pressure sensor that has a single switch with suitable switching hysteresis to set the control limits shown in FIGS. 4B and 4C. A module that uses such a switch-type pressure sensor would be unable to perform the pressure progress test during the charge phase, and hence be incapable of an early abort of a leak test where a gross leak exists, but a gross leak would still eventually be disclosed as a failure at the end of the total test time.

If a pressure sensor has multiple switches set to different pressures, it can perform the pressure progress test and can detect a refueling event. Using the example of FIG. 6, a first switch of such a sensor is set to 10 millibars and a second is set to 5 millibars. The second switch enables the pressure progress test to be performed, and it also serves to detect a refueling event. The first switch distinguishes between a passed fuel system and a failed one.

The invention also enables a basic module to measure different leak size settings for various vehicle applications without hardware modification. Tailoring, if needed, can be accomplished by software modifications.

Figure 7:
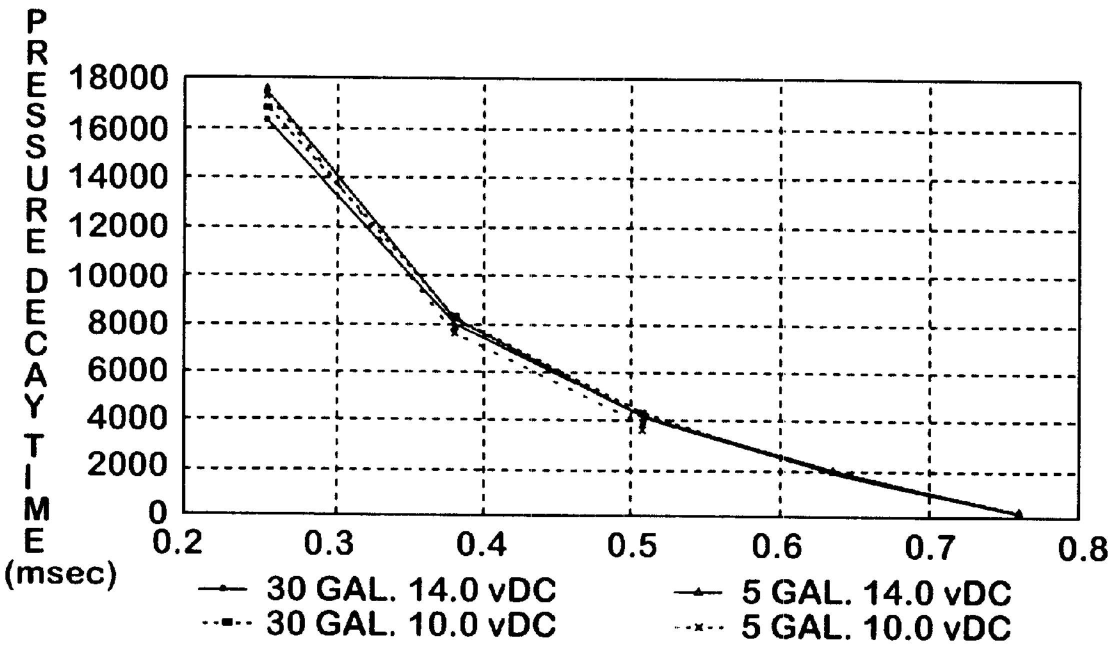
FIG. 7 is graph plot showing a lack of substantial influence of effective leak size and fuel level on the inventive leak test method.

In addition to advantages previously discussed, the method of the present invention also has the advantage of being fairly insensitive to influences such as fluctuations in power supply voltage and in fuel level in a tank. This is shown by FIG. 7.

It is to be understood that because the invention may be practiced in various forms within the scope of the appended claims, certain specific words and phrases that may be used to describe a particular exemplary embodiment of the invention are not intended to necessarily limit the scope of the invention solely on account of such use.

What is claimed is:

1. A leak test system for a motor vehicle fuel system that holds volatile liquid fuel for operating the vehicle, the leak test system comprising:

a processor for establishing steps of a leak test;

a pump for forcing air under pressure into vapor containment space of the fuel system during a leak test;

a pump operator that operates the pump in accordance with steps established by the processor to cause the pump to create a superatmospheric target pressure in the space during an initial step of the leak test, and that after completion of the initial step and in the presence of leakage from the space, causes the pump to operate according to a repeating duty cycle wherein the duty cycle comprises forcing air into the space in successive bursts of individual air pulses, each of which bursts is delayed from an immediately prior burst by a time interval during which pressure in the space decays because of the leakage; and wherein the processor processes, according to an algorithm, data corresponding to the duty cycle and uses the result of such processing to set the number of individual air pulses in each of subsequent bursts for regulating the pressure in the space substantially to the target pressure, and upon attainment of substantial stability in regulation of the pressure in the space at the target pressure, as indicated by attainment of substantial stability of the duty cycle, the processor processes data correlated with the duty cycle to indicate leakage from the space.

2. A leak test system as set forth in claim 1 wherein during the initial step of the leak test, the processor performs a pressure progress test to ascertain if pressure is increasing sufficiently fast in the space to allow a valid leak test to be completed within an amount of time allotted for the leak test.

3. A leak test system as set forth in claim 2 wherein the pressure progress test comprises the processor processing data corresponding to a measurement of pressure in the space and data defining an intermediate pressure representing a measure of progress in creating suitable superatmospheric pressure in the space that will enable the leak test to be performed within the amount of time allotted for the leak test, and if the latter processing discloses that pressure in the space is not less than the intermediate pressure, the processor allows the leak test to continue.

4. A leak test system as set forth in claim 3 wherein the pressure progress test also includes the processor processing data representing elapse of time since the beginning of the initial step of the leak test and data representing an intermediate time limit, and if both a) the processing of data corresponding to a measurement of pressure in the space and data defining the intermediate pressure discloses that pressure in the space is not less than the intermediate pressure, and b) the processing of data representing elapse of time since the beginning of the initial step of the leak test and data representing an intermediate time limit discloses that elapse of time since the beginning of the initial step of the leak test is less than the intermediate time limit, the processor allows the leak test to continue.

5. A leak test system as set forth in claim 3 wherein, if the processor allows the leak test to continue after having completed the pressure progress test, the processor processes data corresponding to a measurement of pressure in the space and data defining the target pressure, and if the processing of the data corresponding to a measurement of pressure in the space and the data defining the target pressure discloses that pressure in the space is not less than the target pressure, the processor initiates the further step of the leak test.

6. A leak test system as set forth in claim 5 wherein, if the processor allows the leak test to continue after having completed the pressure progress test, the processor processes data corresponding to a measurement of pressure in the space and data defining the target pressure and also processes data representing elapse of time since the beginning of the initial step of the leak test and data representing a maximum allowable leak test time, and if both a) the processing of the data corresponding to a measurement of pressure in the space and the data defining the target pressure discloses that pressure in the space is not less than the suitable superatmospheric pressure, and b) the processing of data representing elapse of time since the beginning of the initial step of the leak test and data representing the maximum allowable leak test time discloses that elapse of time since the beginning of the initial step of the leak test has not exceeded maximum allowable leak test time, the processor initiates the further step of the leak test.

7. A leak test system as set forth in claim 6 wherein the processing of data representing elapse of time since the beginning of the initial step of the leak test and data representing the maximum allowable leak test time comprises the processor processing data representing elapse of time since the beginning of the initial step of the leak test and data representing a maximum time allowed for the pump to increase the pressure in the space from the pressure present at the beginning of the initial step of the leak test to the target pressure in the presence of a leak smaller than a gross leak.

8. A leak test system as set forth in claim 5 wherein, if the processor allows the leak test to continue after having completed the pressure progress test, the processor processes data corresponding to a measurement of pressure in the space and data defining the target pressure and also processes data representing elapse of time since the pressure progress test and data representing a maximum allowable time for the pressure to increase from the intermediate pressure to the target pressure, and if both a) the processing of the data corresponding to a measurement of pressure in the space and the data defining the target pressure discloses that pressure in the space is not less than the suitable superatmospheric pressure, and b) the processing of data representing elapse of time since the pressure progress test and data representing the maximum allowable time for the pressure to increase from the intermediate pressure to the suitable superatmospheric pressure discloses that elapse of time since the pressure progress test time has not exceeded the maximum allowable time for the pressure to increase from the intermediate pressure to the suitable superatmospheric pressure, the processor initiates the further step of the leak test.

9. A leak test system as set forth in claim 8 wherein the processing of data representing elapse of time since the conclusion of the pressure progress test and data representing the maximum allowable time for the pressure to increase from the intermediate pressure to the target pressure comprises the processor processing data representing elapse of time since the conclusion of the pressure progress test and data representing a maximum time allowed for the pump to increase the pressure in the space from the intermediate pressure to the target pressure in the presence of a leak smaller than a gross leak.

10. A leak test system as set forth in claim 5 wherein, if the processor allows the leak test to continue after having completed the pressure progress test, the processor processes data corresponding to a measurement of pressure in the space and data defining the target pressure, processes data representing elapse of time since the beginning of the initial step of the leak test and data representing a maximum allowable leak test time in the presence of a leak smaller than a gross leak, and processes data representing elapse of time since the pressure progress test and data representing a maximum allowable time for the pressure to increase from the intermediate pressure to the target pressure in the presence of a leak smaller than a gross leak, and if a) the processing of the data corresponding to a measurement of pressure in the space and the data defining the target pressure discloses that pressure in the space is not less than the target pressure, b) the processing of data representing elapse of time since the beginning of the initial step of the leak test and data representing the maximum allowable leak test time in the presence of a leak smaller than a gross leak discloses that elapse of time since the beginning of the initial step of the leak test has not exceeded maximum allowable leak test time in the presence of a leak smaller than a gross leak, and c) the processing of data representing elapse of time since the pressure progress test and data representing the maximum allowable time for the pressure to increase from the intermediate pressure to the target pressure in the presence of a leak smaller than a gross leak discloses that elapse of time since the pressure progress test time has not exceeded the maximum allowable time for the pressure to increase from the intermediate pressure to the suitable superatmospheric pressure in the presence of a leak smaller than a gross leak, the processor initiates the further step of the leak test.

11. A leak test system as set forth in claim 1 wherein the pump comprises a diaphragm pump that is repeatedly stroked to force air into the space.

12. A leak test system as set forth in claim 11 wherein during the further step of the leak test, each stroke of the diaphragm pump creates a corresponding pulse of air that is forced into the space.

13. A leak test system as set forth in claim 1 wherein the processor processes the data corresponding to the durations of the time intervals according to an algorithm for regulating the pressure in the space substantially to the target pressure by performing proportional, integral, and derivative operations on the time interval duration data.

14. A leak test system as set forth in claim 13 wherein upon attainment of substantial stability of regulation of the pressure in the space substantially to the target pressure, as indicated by attainment of substantial stability of the duty cycle, the processor processes data corresponding to the period of the duty cycle to indicate leakage from the space.

15. A leak test method for a motor vehicle fuel system that holds volatile liquid fuel for operating the vehicle, the method comprising:

forcing air under pressure into vapor containment space of the fuel system during a leak test in accordance with steps of the method;

wherein during an initial step of the method, the forcing of air into the space creates in the space a superatmospheric pressure suitable for performing the leak test; and after completion of the initial step and in the presence of leakage from the space, operating a pump according to a repeating duty cycle wherein the duty cycle comprises forcing air into the space in successive bursts of individual air pulses, each of which bursts is delayed from an immediately prior burst by a time interval during which pressure in the space decays because of the leakage; and processing, according to an algorithm, data corresponding to the duty cycle and using the result of such processing to set the number of individual air pulses in each of subsequent bursts for regulating the pressure in the space substantially to the target pressure, and upon attainment of substantial stability in regulation of the pressure in the space at the target pressure, as indicated by attainment of substantial stability of the duty cycle, processing data correlated with the duty cycle to indicate leakage from the space.

16. A method as set forth in claim 15 including the step of performing a pressure progress test during the initial step of the leak test to ascertain if pressure is increasing sufficiently fast in the space to allow a valid leak test to be completed within an amount of time allotted for the leak test.

17. A method as set forth in claim 16 wherein the step of performing a pressure progress test comprises processing data corresponding to a measurement of pressure in the space and data defining an intermediate pressure representing a measure of progress in creating suitable superatmospheric pressure in the space that will enable the leak test to be performed within the amount of time allotted for the leak test, and if the latter processing discloses that pressure in the space is not less than the intermediate pressure, allowing the leak test to continue.

18. A method as set forth in claim 17 wherein the step of performing a pressure progress test also includes processing data representing elapse of time since the beginning of the initial step of the leak test and data representing an intermediate time limit, and if both a) the processing of data corresponding to a measurement of pressure in the space and data defining the intermediate pressure discloses that pressure in the space is not less than the intermediate pressure, and b) the processing of data representing elapse of time since the beginning of the initial step of the leak test and data representing an intermediate time limit discloses that elapse of time since the beginning of the initial step of the leak test is less than the intermediate time limit, allowing the leak test to continue.

19. A method as set forth in claim 17 wherein, if the leak test is allowed to continue after completion of the pressure progress test, performing the further step of processing data corresponding to a measurement of pressure in the space and data defining the suitable superatmospheric pressure, and if the processing of the data corresponding to a measurement of pressure in the space and the data defining the suitable superatmospheric pressure discloses that pressure in the space is not less than the suitable superatmospheric pressure, initiating the further step of the leak test.

20. A method as set forth in claim 19 wherein, if the leak test is allowed to continue after completion of the pressure progress test, performing the steps of processing data corresponding to a measurement of pressure in the space and data defining the suitable superatmospheric pressure for performing the leak test and also of processing data representing elapse of time since the beginning of the initial step of the leak test and data representing a maximum allowable leak test time, and if both a) the processing of the data corresponding to a measurement of pressure in the space and the data defining the suitable superatmospheric pressure for performing the leak test discloses that pressure in the space is not less than the suitable superatmospheric pressure, and b) the processing of data representing elapse of time since the beginning of the initial step of the leak test and data representing the maximum allowable leak test time discloses that elapse of time since the beginning of the initial step of the leak test has not exceeded maximum allowable leak test time, initiating the further step of the leak test.

21. A method as set forth in claim 20 wherein the processing of data representing elapse of time since the beginning of the initial step of the leak test and data representing the maximum allowable leak test time comprises processing data representing elapse of time since the beginning of the initial step of the leak test and data representing a maximum time allowed for the pump to increase the pressure in the space from the pressure present at the beginning of the initial step of the leak test to the suitable superatmospheric pressure in the presence of a leak smaller than a gross leak.

22. A method as set forth in claim 19 wherein, if the leak test is allowed to continue after the pressure progress test has been completed, performing the steps of processing data corresponding to a measurement of pressure in the space and data defining the suitable superatmospheric pressure for performing the leak test and also of processing data representing elapse of time since the pressure progress test and data representing a maximum allowable time for the pressure to increase from the intermediate pressure to the suitable superatmospheric pressure, and if both a) the processing of the data corresponding to a measurement of pressure in the space and the data defining the suitable superatmospheric pressure for performing the leak test discloses that pressure in the space is not less than the suitable superatmospheric pressure, and b) the processing of data representing elapse of time since the pressure progress test and data representing the maximum allowable time for the pressure to increase from the intermediate pressure to the suitable superatmospheric pressure discloses that elapse of time since the pressure progress test time has not exceeded the maximum allowable time for the pressure to increase from the intermediate pressure to the suitable superatmospheric pressure, the processor initiates the further step of the leak test.

23. A method as set forth in claim 22 wherein the processing of data representing elapse of time since the conclusion of the pressure progress test and data representing the maximum allowable time for the pressure to increase from the intermediate pressure to the suitable superatmospheric pressure comprises processing data representing elapse of time since the conclusion of the pressure progress test and data representing a maximum time allowed for the pump to increase the pressure in the space from the intermediate pressure to the suitable superatmospheric pressure in the presence of a leak smaller than a gross leak.

24. A method as set forth in claim 19 wherein, if the leak test is allowed to continue after completion of the pressure progress test, performing the steps of processing data corresponding to a measurement of pressure in the space and data defining the suitable superatmospheric pressure for performing the leak test, of processing data representing elapse of time since the beginning of the initial step of the leak test and data representing a maximum allowable leak test time in the presence of a leak smaller than a gross leak, and of processing data representing elapse of time since the pressure progress test and data representing a maximum allowable time for the pressure to increase from the intermediate pressure to the suitable superatmospheric pressure in the presence of a leak smaller than a gross leak, and if a) the processing of the data corresponding to a measurement of pressure in the space and the data defining the suitable superatmospheric pressure for performing the leak test discloses that pressure in the space is not less than the suitable superatmospheric pressure, b) the processing of data representing elapse of time since the beginning of the initial step of the leak test and data representing the maximum allowable leak test time in the presence of a leak smaller than a gross leak discloses that elapse of time since the beginning of the initial step of the leak test has not exceeded maximum allowable leak test time in the presence of a leak smaller than a gross leak, and c) the processing of data representing elapse of time since the pressure progress test and data representing the maximum allowable time for the pressure to increase from the intermediate pressure to the suitable superatmospheric pressure in the presence of a leak smaller than a gross leak discloses that elapse of time since the pressure progress test time has not exceeded the maximum allowable time for the pressure to increase from the intermediate pressure to the suitable superatmospheric pressure in the presence of a leak smaller than a gross leak, initiating the further step of the leak test.

25. A method as set forth in claim 15 wherein after completion of the initial step and in the presence of leakage from the space, the step of operating a pump according to a repeating duty cycle wherein the duty cycle comprises forcing air into the space in successive bursts of individual air pulses comprises repeatedly stroking a diaphragm pump.

26. A method as set forth in claim 25 wherein the step of repeatedly stroking a diaphragm pump comprises forcing a pulse of air into the space as a result of each stroke of the diaphragm pump.

27. A method as set forth in claim 15 wherein the step of processing the data corresponding to the durations of the time intervals according to an algorithm for regulating the pressure in the space substantially to the target pressure comprises performing proportional, integral, and derivative operations on the time interval duration data.

28. A method as set forth in claim 27 wherein upon attainment of regulation of the pressure in the space substantially to the target pressure, as indicated by attainment of substantial stability of the duty cycle, comprises processing data corresponding to the period of the duty cycle to indicate leakage from the space.

29. A method as set forth in claim 15 wherein the step of forcing air into the space during the initial step of the method to create superatmospheric pressure suitable for performing the leak test comprises operating the pump to create the superatmospheric pressure.

* * * * *